United States Patent [19]

Moriguchi

[11] Patent Number: 4,477,756
[45] Date of Patent: Oct. 16, 1984

[54] STEPPING MOTOR EXCITING SYSTEM
[75] Inventor: Fujio Moriguchi, Kanagawa, Japan
[73] Assignee: Fuji Xerox Co., Ltd., Kanagawa, Japan
[21] Appl. No.: 446,306
[22] Filed: Dec. 3, 1982
[30] Foreign Application Priority Data
  Dec. 4, 1981 [JP] Japan .................. 56-194441
[51] Int. Cl.³ ......................................... H02K 29/04
[52] U.S. Cl. .................................. 318/696; 318/685
[58] Field of Search ............... 318/696, 685, 138; 365/236

[56] References Cited
U.S. PATENT DOCUMENTS
  3,909,693  9/1975  Yoshitake et al. ............... 318/696
  4,151,449  4/1979  Takahashi ....................... 318/138

Primary Examiner—J. V. Truhe
Assistant Examiner—Saul M. Bergmann
Attorney, Agent, or Firm—Sughrue, Mion, Zinn, Macpeak & Seas

[57] ABSTRACT

A stepping motor exciting system in which the excitation current is set at one of four stepwise values. When the motor is to be driven in a stepwise manner, the excitation current is in the form of a pseudo-trapezoidal wave which is derived in terms of two of possible four values. When the motor is to be driven in a linear manner, the excitation current is in the form of a pseudo-sinusoidal wave which is derived in terms of all four possible values. A ROM stores these sequences of excitation currents and controls the exciting system in accordance with the driving mode desired.

10 Claims, 15 Drawing Figures

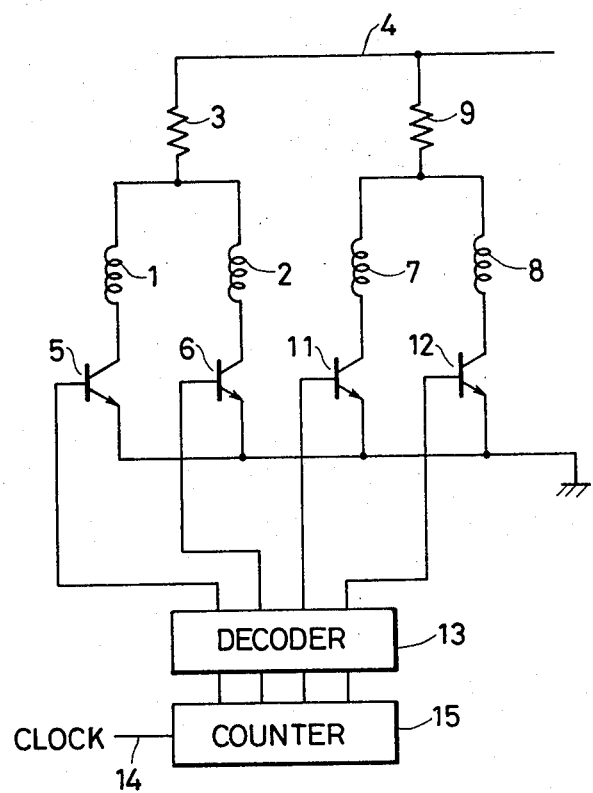
FIG. 1
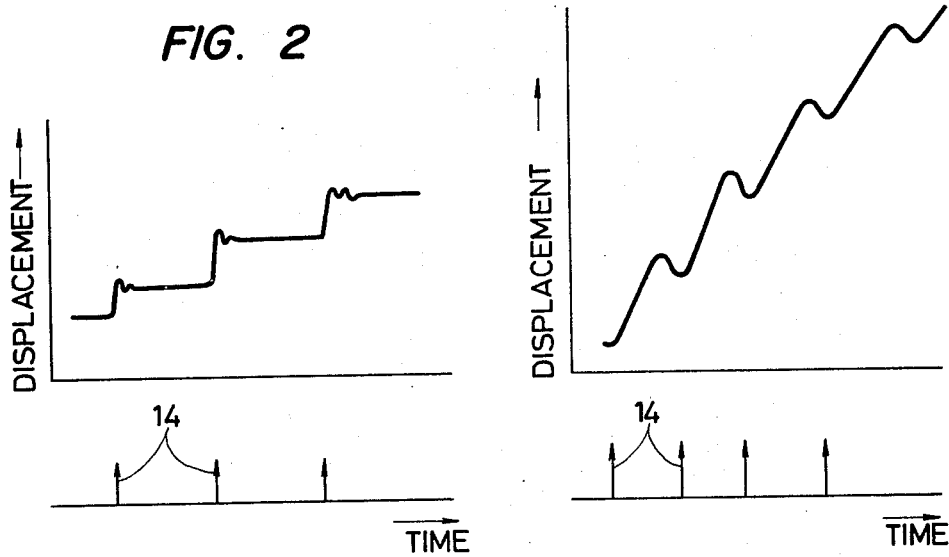
FIG. 2
FIG. 3

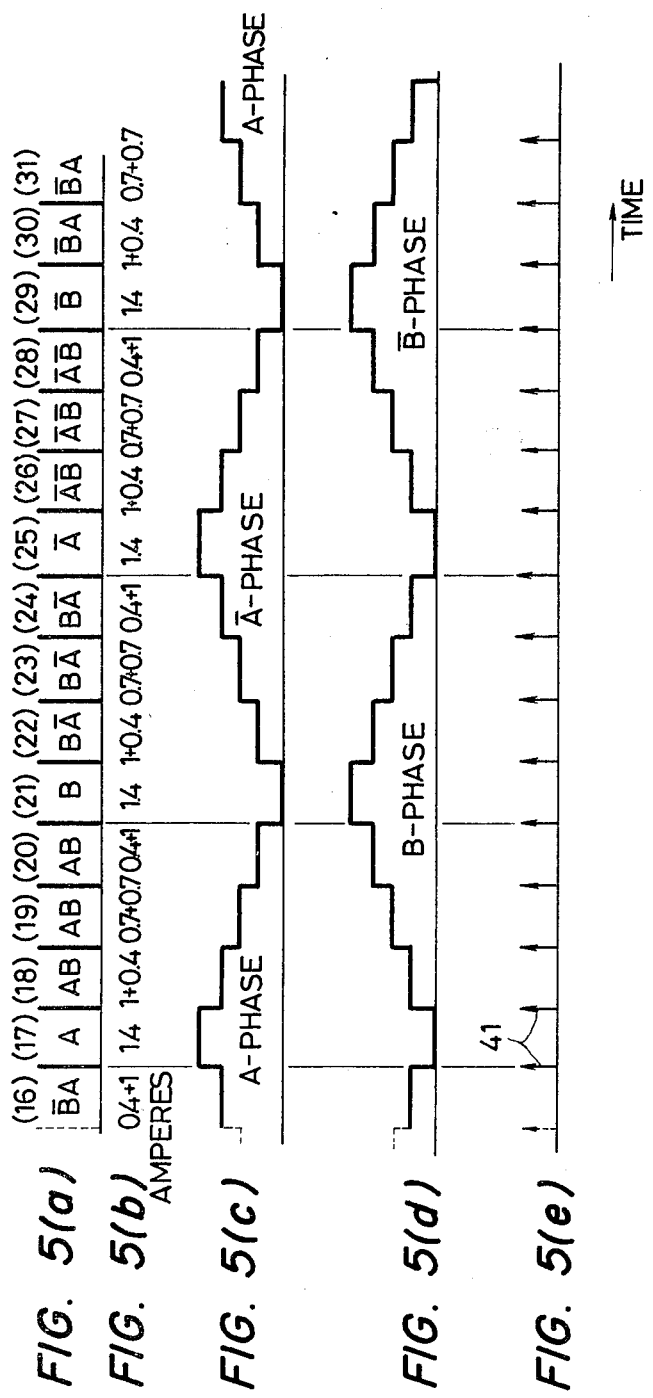

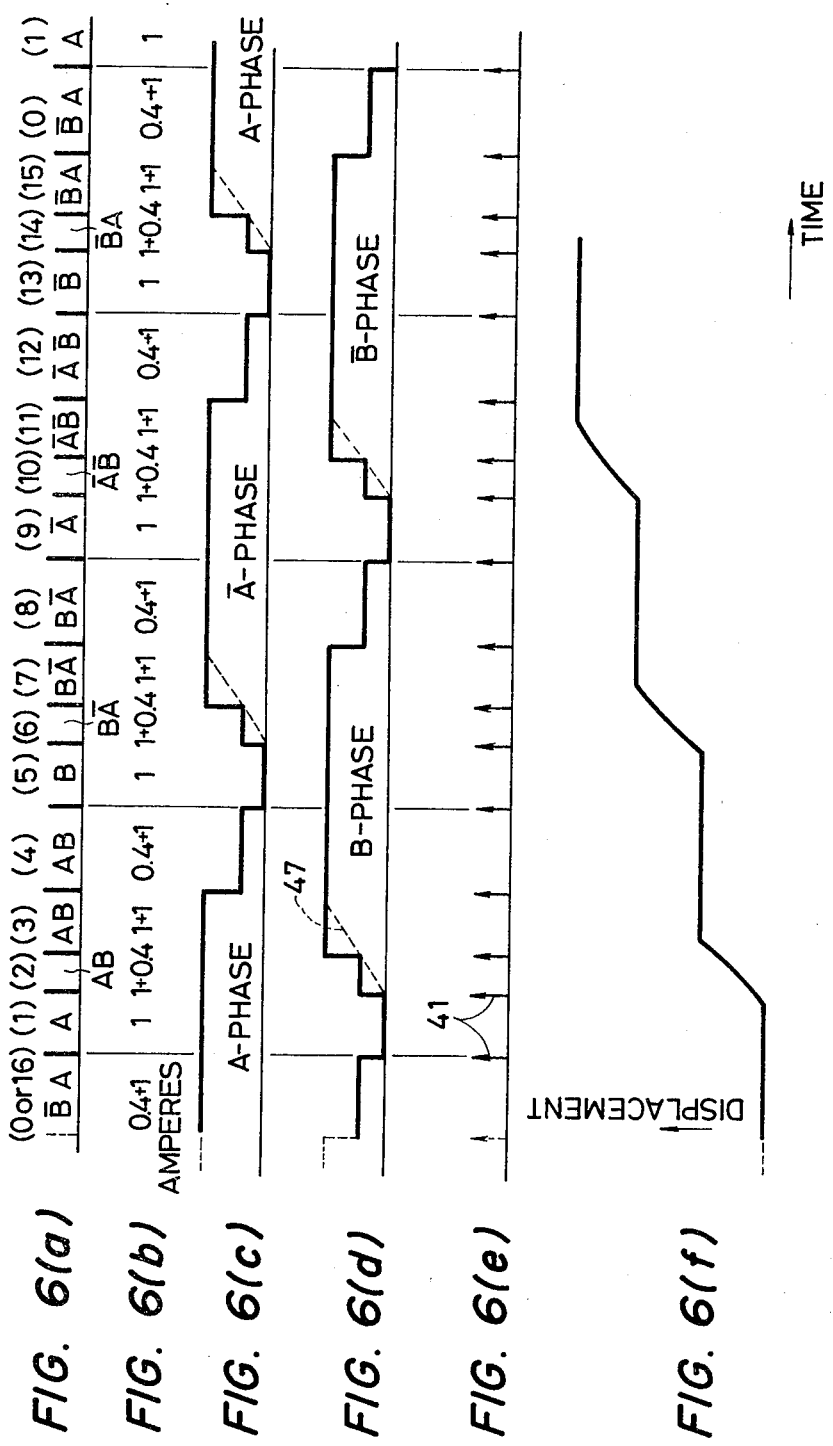

STEPPING MOTOR EXCITING SYSTEM

FIELD OF THE INVENTION

The present invention relates to an exciting system for a stepping motor used as a driving source for facsimile equipment, printers, or the like.

BACKGROUND OF THE INVENTION

In facsimile equipment, for example, a stepping motor is used as a driving source for an original document scanning mechanism and/or a recording paper conveying mechanism.

FIG. 1 shows a conventional exciting circuit for a stepping motor used as such a driving source. In this circuit, one end of each exciting coils 1 and 2 for two phases of a stepping motor is connected commonly through a resistor 3 to a power source line 4. The other ends of the exciting coils 1 and 2 are grounded through collector-emitter circuits of switching transistors 5 and 6, respectively. Similarly, one end of each of the exciting coils 7 and 8 for the other two phases of the stepping motor are connected commonly through a resistor 9 to the power source line 4, and the other ends of coils 7 and 8 are grounded through collector-emitter circuits of switching transistors 11 and 12, respectively. The respective bases of the switching transistors 5, 6, 11 and 12 are connected to the four output terminals of a decoder 13. The decoder 13 serves to selectively turn on the switching transistors 5, 6, 11 and 12 in accordance with an output signal of a counter. The counter counts a motor clock pulse 14 so as to control the excitation of the exciting coils 1, 2, 7 and 8, thereby driving the stepping motor.

When the stepping motor is intermittently driven with this exciting circuit, a stepwise displacement characteristic is exhibited in a low speed driving period, as shown in FIG. 2. That is, the rotary angle of the motor is displaced in a stepwise manner each time the motor clock pulse is produced. On the other hand, if the motor is driven at a high speed in the range of 5–10 milliseconds per step, the rise in displacement in response to the motor clock pulse 14 becomes relative. Since the motor shaft stops for only a very short time during each stoppage period, poor performance in its picture image reading/recording function results.

To solve such a problem which occurs during a high speed driving period, there has been proposed a countermeasure in which the resistors 3 and 9 disposed between the power line 4 and each of the exciting coils 1, 2, 7 and 8, respectively, are replaced by those resistors which have high resistance values. If the resistors 3 and 9 are replaced by resistors having high resistance values, the electrical time constants constituted by the respective inductance values of the exciting coils 1, 2, 7 and 8 are reduced. As such, quick rise times in the excitation currents are preserved (and even enhanced). However, in the case where a stepping motor is driven by such an exciting system as mentioned above, the power loss increases in accordance with the increments of the resistance values, which result in the reduction of driving efficiency relative to the power source for the stepping motor. Further, the amount of heat generated by the resistors 3 and 9 increases in accordance with the reduction of the driving efficiency. This higher amount of heat generation may adversely affect the circuit elements surrounding these resistors. Further, during a linear driving period in which no stepwise displacement is necessary (for example, in the case of white line skipping), noise is generated in the driving system by the displacement characteristic as shown in FIG. 3.

SUMMARY OF THE INVENTION

The present invention is intended to eliminate the drawbacks in the conventional stepping motor exciting system. Thus, an object of the present invention is to provide a stepping motor exciting system in which the stepping motor driving efficiency relative to the power source is improved, and in which stepwise driving or linear driving can be alternatively selected.

According to the invention, four values are set for an exciting current flowing through each exciting coil of a stepping motor. The exciting current is set such that when stepwise driving is to be effected, excitation is made by a current in the form of a pseudo-trapezoidal wave by using two of the four setting current values. When linear driving is to be effected, excitation is made by a current in the form of a pseudo-sinusoidal wave by using all four setting current values. The sequence for each of these excitation methods is written in a read only memory, so that the addresses of the read only memory are selectively accessed in accordance with the desired exciting method.

BRIEF DESCRIPTION OF THE DRAWINGS

FIG. 1 is a block diagram illustrating a conventional stepping motor exciting circuit of the series resistance type;

FIG. 2 is a graph illustrating the rotary characteristic of the stepping motor when the motor is driven at a relatively low speed by using the exciting circuit of FIG. 1;

FIG. 3 is a graph illustrating the rotary characteristic similarly to FIG. 2 but in the case where the stepping motor is driven at a relatively high speed;

FIGS. 5A–5D are time charts showing various conditions in the case of linear driving in the preferred embodiment of the invention as shown in FIG. 4; and FIGS. 6A–6F are time charts showing various conditions in the case of stepwise driving in the preferred embodiment of the invention as shown in FIG. 4.

DETAILED DESCRIPTION OF THE PREFERRED EMBODIMENTS

Figure 4:
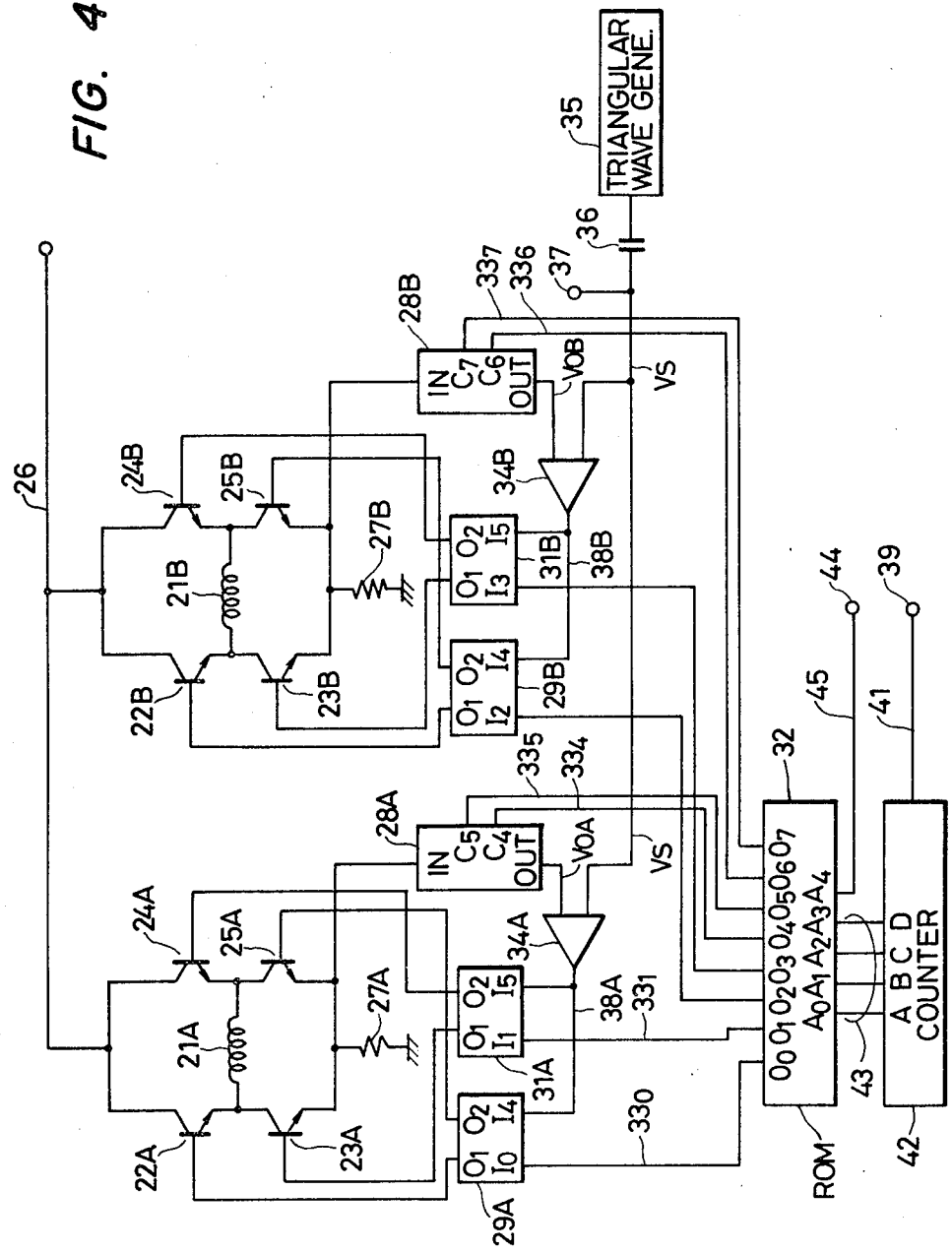
FIG. 4 is a block diagram of the embodiment of the stepping motor exciting circuit according to the present invention.

FIG. 4 shows an exciting circuit for a stepping motor used in the embodiment. In the circuit, bipolar excitation is made with respect to two exciting coils 21A and 21B wound on respective pole pieces of the stepping motor (not shown). The circuit section for controlling the excitation of the exciting coil 21B is analogous in its configuration to that of the circuit section of exciting coil 21A. Accordingly, the present invention will be described with reference to only the circuit section for the exciting coil 21A. Character B is appended to the reference numerals in place of the character A when those component elements used in the circuit section for the other exciting coil 21B correspond to those elements for the exciting circuit section for the exciting coil 21A.

The exciting coil 21A is connected at one end to the emitter of a first switching transistor 22A and the collector of a second switching transistor 23A, and at the other end to the emitter of a third switching transistor 24A and the collector of a fourth switching transistor 25A. The respective collectors of the first and third switching transistors 22A and 24A are commonly connected to a power source line 26, and the respective emitters of the second and fourth switching transistors 23A and 25A are commonly connected to one end of a current detecting resistor 27A, which is grounded at its other end, as well as to an input terminal IN of a current controlling circuit 28A. The respective bases of the first and fourth switching transistors 22A and 25A are connected to output terminals $O_1$ and $O_2$ of an A-phase driving circuit 29A, and the respective bases of the second and third switching transistors 23A and 24A are connected to output terminals $O_1$ and $O_2$ of the $\overline{A}$-phase driving circuit 31A. The respective first input terminals $I_0$ and $I_1$ of the A-phase and $\overline{A}$-phase driving circuits 29A and 31A, respectively, are connected to corresponding output terminals $O_1$ and $O_2$ of a read only memory (ROM) 32. When binary signals $33_0$ and $33_1$ are produced from the output terminals $O_1$ and $O_2$ of ROM 32, the exciting currennt of the exciting coil 21A changes alternately to effect bipolar operation of the motor.

The current controlling circuit 28A operates as a voltage dividing circuit. Two control input terminals $C_4$ and $C_5$ are connected to corresponding output terminals $O_4$ and $O_5$ of the read only memory 32. The current controlling circuit 28A changes a voltage received at its input terminal IN in one of four stepwise values, and outputs this changed voltage as an output voltage $V_{OA}$ from its output teriminal OUT.

A comparator 34A compares the output voltage $V_{OA}$ from the current controlling circuit 28A with a reference voltage $V_S$. The reference voltage $V_S$ is obtained by overlapping a triangular wave produced from a triangular wave generator 35 through a d.c. blocking capacitor 36 with a predetermined d.c. voltage applied to a constant voltage applying terminal 37. An output signal 38A of the comparator 34A is applied simultaneously to input terminals $I_4$ and $I_5$ of A-phase and $\overline{A}$-phase driving circuits 29A and 31A, respectively.

Each of the respective driving circuits 29A and 31A produce output signals at their output terminals $O_1$ and $O_2$, for turning on the switching transistors only when both the input terminals thereof are supplied with high (H) level signals. Therefore, if the motor clock pulse 41 is supplied to a hexadecimal counter 42 and the read only memory 32 is addressed by a binary number 43 produced from output terminals A–D of the counter 43, and if an excitation change-over signal 45 is supplied from an excitation method change-over terminal 44, the excitation current for the exciting coil 21A varies in two-step or four-step stepwise manner in accordance with the addressing to thereby drive the stepping motor.

In the circuit section for the exciting coil 21B, the respective input terminals $I_2$ and $I_3$ of B-phase and $\overline{B}$-phase driving circuits 29B and 31B are connected to output terminals $O_2$ and $O_3$, respectively, of the read only memory 32. Further, two controlling input terminals $C_6$ and $C_7$ of a current controlling circuit 28B are connected to corresponding output terminals $O_6$ and $O_7$ of the read only memory 32 so as to receive binary signals $33_6$ and $33_7$ therefrom, respectively.

In the above-mentioned stepping motor exciting circuit, two-phase excitation one step before one-phase excitation is effected for the step motor as long as the driving system for driving the recording paper is stopped. At this time, the same current flows in the stepping motor either in the case where the stepwise driving is effected or in the case where the linear driving is made. Assume now that the respective states $\overline{B}A$ shown in FIG. 5A and FIG. 6A at the left-hand ends thereof corresponding to these cases. The excitation state $\overline{B}A$ represents the exciting state of two exciting coils 21A and 21B when both the $\overline{B}$-phase driving circuit 31B and the A-phase driving circuit 29A are energized. At this time, an exciting current flows through the exciting coil 21A in the direction from left to right in the drawing, and another exciting current flows through the exciting coil 21B in the direction from right to left in the drawing.

A description will now be made of the case where a linear driving is made from the state $\overline{B}A$, with reference to FIG. 5. In this case, the motor clock pulse 41 is produced at equal intervals as shown in FIG. 5E and is applied to the hexadecimal counter 42 (FIG. 4). At the same time, the excitation change-over signal 45 of a level H is applied to the exciting method change-over terminal 44. The hexadecimal counter 42 counts the motor clock pulses 41 and produces a numeric value from "0" to "15" in a four-bit binary number 43 at its output terminals A–D. The four-bit binary number 43 is applied to the lower four-bit terminals $A_0$–$A_3$ of a five-bit address terminal $A_0$–$A_4$ of the read only memory 32. The excitation change-over signal 45 is applied to the uppermost address terminal $A_4$ of the read only memory 32. As the result, in the case where the stepping motor is linearly driven by the exciting circuit, the address from "16" to "31" are successively and cyclically accessed by the motor clock pulse 41.

If the address "17" of the read only memory 32 is accessed by a first motor clock pulse (FIG. 5A), the following logic signals are produced at the output terminals $O_0$–$O_7$ of the read only memory 32:

ADDRESS "17":  $O_0 = H, O_1 = L, O_2 = L, O_3 = L,$
$O_4 = H, O_5 = H, O_6, O_7 = H$ or $L$
(arbitrary), where H and L represent high and low levels, respectively. Under this condition, only the A-phase driving circuit 29A receiving an H-level signal among the four driving circuits 29A, 29B, 31A and 31B is in its operating state. The current detecting resistor 27A, with the highest ratio thereof being used to control the current flowing through the exciting coil 21A to be 1.4 amperes by the on-off control by the A-phase driving circuit 29A. At this time, A-phase excitation is effected with respect to the exciting coil 21A (FIG. 5C), while no excitation is made with respect to the excitation coil 21B (FIG. 5D). That is, in this case, only one-phase (A-phase) excitation is made (FIG. 5A) and the sum of currents flowing through the exciting coils 21A and 21B (in this case only the current of exciting coil 21A) is 1.4 amperes (FIG. 5B).

If the next motor clock pulse is generated after a predetermined period of time, the address "18" of the read only memory 32 is accessed and the following logic signals are produced at the output terminals $O_0$–$O_7$:

ADDRESS "18":  $O_0 = H, O_1 = L, O_2 = H, O_3 = L,$
$O_4 = L, O_5 = H, O_6 = L, O_7 = L.$

Under this condition, the A-phase and B-phase driving circuits 29A and 29B are in their activated state. The current controlling circuit 28A divides the voltage with the second highest ratio so as to effect A-phase excitation with an exciting current of 1.0 amperes (FIG. 5C), while the current controlling circuit 28B divides the voltage with the fourth highest ratio (that is, the lowest ratio) or merely passes the current through resistor to effect B-phase excitation with an exciting current of 0.4 amperes (FIG. 5D). The sum of currents flowing through the exciting coils 21A and 21B is 1+0.4=1.4 amperes. Note that this sum remains constant throughout the excitation cycle.

Similarly, when the address "19" of the read only memory 32 is accessed, the A-phase and B-phase driving circuits 29A annd 29B continuously maintain their actuated state and each of the current controlling circuits 28A and 28B divides the voltage with the third highest ratio. This, two-phase excitation, i.e., A-phase and B-phase excitation is effected with an excitation current of 0.7 amperes in coils 21A annd 21B.

In a similar manner, as shown in FIG. 5C and D, one-phase and two-phase excitations are effected by a pseudo-sinusoidal waveform by using four discrete current values. In this case, a linear driving method is produced which approximates that effected by a sinusoidal excitation current. The sum of the currents flowing through the exciting coils 21A and 21B is constant at 1.4 amperes at each step of the stepwise excitation.

Table 1 shows the relationship between the addresses of the read only memory 32 and the signals appearing at the output terminals $O_0$–$O_7$ thereof in this linear driving period. In Table 1, the symbol "-" represents the case where it is not necessary to specify the logic state.

TABLE 1

| ADDRESS | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| OUTPUT TERMINAL | | | | | | | | | | | | | | | | |
| $O_0$ | H | H | H | H | H | L | L | L | L | L | L | L | L | L | H | H |
| $O_1$ | L | L | L | L | L | L | H | H | H | H | H | H | H | L | L | L |
| $O_2$ | L | LL | H | H | H | H | H | H | H | L | L | L | L | L | L | L |
| $O_3$ | H | L | L | L | L | L | L | L | L | L | H | H | H | H | H | H |
| $O_4$ | L | H | L | H | L | – | L | H | L | H | L | H | L | – | L | H |
| $O_5$ | H | H | H | L | L | – | L | L | H | H | H | L | L | – | L | L |
| $O_6$ | L | – | L | H | L | H | L | H | L | – | L | H | L | H | L | H |
| $O_7$ | L | – | L | L | H | H | H | L | L | – | L | L | H | H | H | L |

A description will now be made with respect to the case when stepwise driving is effected under the condition of address "16" excitation (stoppage state) after the linear driving has been effected, with reference to FIG. 6.

If the driving method is changed over, the motor clock pulse 41 is generated at intervals as shown in FIG. 6E and is applied to the hexadecimal counter 42 (FIG. 4). At the same time, the excitation method change-over terminal 44 is supplied with an excitation change-over signal 45 of L-level. In the same manner as described above, the hexadecimal counter 42 counts the motor clock pulse 41 and produces numeric values of "0" to "15" as a four-bit binary number 43 at the output terminals A–D thereof. As a result, in this case, the addresses from "0" to "15" are successively and cyclically accessed.

When the address "1" of the read only memory 32 is addressed by the first motor clock pulse after the change-over of the driving system (FIG. 6A), the following logic signals are produced at the outputs $O_0$–$O_7$:

ADDRESS "1": $O_0$ = H, $O_1$ = L, $O_2$ = L, $O_3$ = L, $O_4$ = L, $O_5$ = H, $O_6$, $O_7$ = H or L (arbitrary).

Under this condition, only the A-phase driving circuit 29A which receives an H-level signal is in is operating state (FIG. 6C), such that one-phase excitation for only the A-phase is effected (FIG. 6A). The current controlling circuit 28A divides the voltage with the second highest ratio so that the current flowing through the exciting coil 21A is 1.0 amperes. At this time, the sum of the currents flowing through the exciting coils (in this case, a current flows only through the exciting coil 21A) is 1.0 amperes (FIG. 6B).

When the next motor clock pulse is generated, the address "2" of the read only memory 32 is accessed and the following logic signals are produced at the output terminals $O_0$–$O_7$:

ADDRESS "2": $O_0$ = H, $O_1$ = L, $O_2$ = H, $O_3$ = L, $O_4$ = L, $O_5$ = H, $O_6$ = L, $O_7$ = L.

Under this condition, both the A-phase and B-phase driving circuit 29A and 29B are in their actuated state. That is, two-phase excitations, i.e., A-phase excitation as well as B-phase excitation, are effected (FIG. 6A, C, D). At this time, a current of 1.0 amperes through the exciting coil 21A and a current of 0.4 amperes flows through the exciting coil 21B. The sum of the currents is 1.4 amperes (FIG. 6B).

Similarly, if the address "3" of the read only memory 32 is accessed, two-phase excitations, i.e., A-phase excitation as well as B-phase excitation, are effected and the exciting current flowing through the exciting coil 21B increases from 0.4 amperes to 1.0 amperes. This increase in exciting current is done linearly by the inductance of a coil as shown by a dotted line 47 in FIG. 6D. In response to the change in exciting current, the step motor displaces its rotary angle to its stoppage position.

In the same manner, as shown in FIG. 6C and D, driving is made by means of a pseudo-trapezoidal waveform so that the stepping motor is displaced stepwise (FIG. 6F). In this case, the sum of the currents flowing through the exciting coils 21A and 21B (FIG. 6B) changes stepwise in three steps from 1.0 to 2.0 amperes in accordance with the two different currents. Table 2 shows the relationship in this stepwise driving method between the addresses of the read only memory 32 and the signals appearing at the output terminals $O_0$–$O_7$.

TABLE 2

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| OUTPUT TERMINALS | | | | | | | | | | | | | | | | |
| $O_0$ | H | H | H | H | H | L | L | L | L | L | L | L | L | L | H | H |
| $O_1$ | L | L | L | L | L | L | H | H | H | H | H | H | H | L | L | L |
| $O_2$ | L | L | H | H | H | H | H | H | H | L | L | L | L | L | L | L |
| $O_3$ | H | L | L | L | L | L | L | L | L | L | H | H | H | H | H | H |
| $O_4$ | L | L | L | L | L | — | L | L | L | L | L | L | L | — | L | L |
| $O_5$ | H | H | H | H | L | — | L | H | H | H | H | L | — | L | L | H |
| $O_6$ | L | — | L | L | L | L | L | L | L | — | L | L | L | L | L | L |
| $O_7$ | L | — | L | H | H | H | H | H | L | — | L | H | H | H | H | H |

A stepping motor utilizing the exciting system according to the present invention may produce a torque two times as great as that produced by a conventional exciting system while utilizing the relatively simple configuration of the latter. For example, a motor of such a size ordinarily used in facsimile equipment or the like may produce an axial torque of about 2-7 Kg-cm. Furthermore, in stepwise driving, it is possible to effect subscanning feeding at a speed of about 5-10 msec. per line within a short setting time (i.e., within the time during which oscillation continues). Finally, since the current flowing through each excitation coil is set at four different values, and since two of the four values are used for stepwise driving as well as linear driving, the exciting circuit may be of a relatively simple construction.

What is claimed is:

1. A stepping motor excitation system for effecting one or two-phase excitation of excitation coils of a motor in either a stepwise mode or a linear mode, said system comprising:
   means for causing excitation currents flowing through said excitation coils of a stepping motor to have four stepwise fixed values respectively;
   current value setting means for setting said means for causing excitation currents flowing through each of said excitation coils to one of four stepwise fixed values;
   memory means provided with first and second storage areas, wherein said first storage area stores information for controlling the current flowing through each of said excitation coils when said motor is to be run in the stepwise mode, and wherein said second storage area stores information for controlling the current flowing through each of said excitation coils when said motor is to be run in a linear mode; and
   selecting means for selecting one of said storage areas of said memory means in accordance with a desired mode of operation of said motor.

2. The stepping motor excitation system as recited in claim 1, wherein said second storage area stores signals which cause said excitation currents to have a pseudo-sinusoidal waveform.

3. The stepping motor excitation system as recited in claim 1, wherein said first storage area stores signals which cause said excitation currents to have a pseudo-trapezoidal waveform.

4. The stepping motor excitation system as recited in claim 2, wherein said pseudo-sinusoidal waveform is produced by utilizing all four of said four stepwise fixed values.

5. The stepping motor excitation system as recited in claim 3, wherein said pseudo-trapezoidal waveform is produced by utilizing a second and a fourth of said four stepwise fixed values.

6. A stepping motor excitation system for effecting one or two-phase excitation of two excitation coils of a motor in either a stepwise mode or a linear mode, said system comprising:
   a first set of switches and a second set of switches with a first excitation coil connected therebetween, said first set of switches being connected to a power source;
   a first current detector, said first current detector being connected to said second set of switches and producing a first current detection voltage;
   a third set of switches and a fourth set of switches with a second excitation coil connected therebetween, said first set of switches being connected to a power source;
   a second current detector, said second current detector being connected to said second set of switches and producing a second current detection voltage;
   a first driving circuit for controlling said first set of switches;
   a second driving circuit for controlling said second set of switches;
   a third driving circuit for controlling said third set of switches;
   a fourth driving circuit for controlling said fourth set of switches;
   a first current control circuit, said first current control circuit receiving a signal from said first current detector and producing a first current control voltage;
   a second current control circuit, said second current control circuit receiving a signal from said second current detector and producing a second current control voltage;
   a first comparator for comparing said first current control voltage to a reference voltage and producing a first comparator control voltage which is outputted to said first and second driving circuits;
   a second comparator for comparing said second current control voltage to said reference voltage and producing a second composite control signal which is outputted to said third and fourth driving circuits;
   a source of clock pulses;
   counting means for counting said clock pulses and producing a count signal;
   memory means for receiving said count signal and producing a plurality of excitation control signals of one of two modes which are outputted to each of said driving circuits and each of said current control circuits, respectively; and
   switching means for switching said plurality of excitation control signals between said modes in accordance with a desired mode of operation of said motor.

7. The stepping motor excitation system as recited in claim 6, wherein each of said sets of switches comprise sets of transistors, each of said transistors having three terminals, a first terminal of each of said transistors in said first, second, third and fourth sets of switches being connected to said first, second, third and fourth driving circuits respectively.

8. The stepping motor excitation as recited in claim 6, wherein said first and second current control circuits comprise first and second voltage dividers, said first and second voltage dividers dividing said first and second current detection voltages by ratios set in accordance with said excitation control signals received from said memory means.

9. The stepping motor excitation system as recited in claim 6, wherein memory means outputs a different plurality of excitation signals of one of said two modes of each increment in said count output of said counting means.

10. The stepping motor excitation system as recited in claim 9, wherein said counting means recycles to zero once a specific count is reached.

* * * * *